United States Patent
Peterson et al.

(10) Patent No.: US 6,939,123 B2
(45) Date of Patent: Sep. 6, 2005

(54) ELECTROFORMED ADHESIVE LAMINATED TOOLING SURFACE WITH PRECISION STRUCTURED INTERFACES

(75) Inventors: Robert W. Peterson, Spring Valley, WI (US); Brian W. Lueck, Houlton, WI (US)

(73) Assignee: 3M Innovative Properties Company, St. Paul, MN (US)

(*) Notice: Subject to any disclaimer, the term of this patent is extended or adjusted under 35 U.S.C. 154(b) by 117 days.

(21) Appl. No.: 10/329,837

(22) Filed: Dec. 26, 2002

(65) Prior Publication Data

US 2004/0126455 A1 Jul. 1, 2004

(51) Int. Cl.[7] .............................................. B29D 11/00
(52) U.S. Cl. ....................... 425/470; 428/810; 156/330; 156/349; 205/67
(58) Field of Search ............................. 425/470, 810; 264/106, 107; 156/330, 349; 205/67, 70

(56) References Cited

U.S. PATENT DOCUMENTS

| | | | |
|---|---|---|---|
| 4,285,901 A | 8/1981 | Yotsutsuji et al. | |
| 5,156,754 A | * 10/1992 | Nomura et al. | 249/134 |
| 5,330,880 A | * 7/1994 | Horigome et al. | 430/321 |
| 6,354,827 B1 | 3/2002 | Kerfeld | |
| 6,464,487 B2 | * 10/2002 | Gabriel | 425/542 |
| 2003/0224084 A1 | * 12/2003 | Nishiyama et al. | 425/403 |

FOREIGN PATENT DOCUMENTS

| | | |
|---|---|---|
| DE | 19933530 | 1/2001 |
| EP | 0 765 734 A2 | 4/1997 |
| JP | 58185049 | 10/1983 |
| JP | 60149422 | 8/1985 |
| JP | 62167639 | * 7/1987 |
| JP | 02068744 | 3/1990 |
| JP | 4131211 A | 5/1992 |
| JP | 9300359 A | 11/1997 |
| JP | 10315273 | 12/1998 |

OTHER PUBLICATIONS

English Abstract for JP 62–167639.*

* cited by examiner

*Primary Examiner*—Donald Heckenberg
(74) *Attorney, Agent, or Firm*—Rick L. Franzen; Brian E. Szymanski; Gary L. Griswold

(57) ABSTRACT

An insert for a mold, particularly a thermoplastic injection mold, including a stamper having an impression surface and a backing surface. The insert also has a support block having a facing surface having a plurality of projections thereon, with the plurality of projections in contact with the backing surface. A quantity of adhesive is disposed between the sides of the projections adhering the facing surface to the backing surface. A method for fabricating such an insert for a mold is also disclosed.

25 Claims, 2 Drawing Sheets

ELECTROFORMED ADHESIVE LAMINATED TOOLING SURFACE WITH PRECISION STRUCTURED INTERFACES

TECHNICAL FIELD

The invention relates generally to injection molding. More particularly, the present invention relates to the preparation of tooling for the injection molding of precision surfaces, especially optical grade surfaces.

BACKGROUND

Injection molding has long been one of the methods of choice for the fabrication of multiple similar parts in polymers. However, when the parts to be molded require, e.g. high precision dimensions within detailed structures, the preparation of a suitable mold rapidly becomes difficult. With some simple part geometries it may be possible to directly machine mold surfaces. However, in more complex situations it is known to prepare surfaces of hard copper by such techniques as diamond turning, direct cutting, and broaching, and then using the copper master to produce electroforms in nickel for subsequent polymer molding processes.

The use of such electroforms is a useful technique, but limited by the lack of ways to install these surfaces into molds. For example, electroformed stampers have been mounted to a thick plate by mechanical fasteners, by perimeter welding, by soldering, and by brazing. Monolithic platings, e.g. 12.7 mm (0.5 inch), have been fabricated for direct insertion into molds. However none of these are generally viable techniques having broad commercial application.

A notable exception is the compact disc industry; masters are often made using photolithography, and electroformed stampers produced off these masters. The subsequent operations of transforming them into a circular part with a hole in the center allows for installation into the mold by using two rings, an inner and outer retaining ring, which captures or 'picture frames' the periphery of the electroforms as well as forming the two diameters of the product. For products larger than 130 mm, however, this technique is not practical because such retention at the outside diameter and the inside diameter is not sufficient to constrain deflection of the stamper during the process. The art is still in need of a method to provide a mold having an insert with a precision surface that is effective and yet applicable to a wide range of part sizes and geometries.

SUMMARY OF THE INVENTION

The present invention provides an insert for a mold including a stamper having an impression surface and a backing surface. The insert also has a support block having a facing surface having a plurality of projections thereon, with the plurality of projections in contact with the backing surface. A quantity of adhesive is disposed between the projections adhering the facing surface to the backing surface.

In a second aspect, the invention provides a method for fabricating an insert for a mold. The method includes the step of fabricating a stamper having an impression surface and a backing surface and the step of fabricating a support having a facing surface with a plurality of projections thereon. The backing surface is positioned in contact with the plurality of projections, and the stamper is adhered to the support with a quantity of adhesive disposed between the projections.

BRIEF DESCRIPTION OF THE DRAWING

In the several figures of the attached drawing, like parts bear like reference numerals, and.

Patents, patent applications, and publications disclosed herein are hereby incorporated by reference (in their entirety) as if individually incorporated. It is to be understood that the above description is intended to be illustrative, and not restrictive. Various modifications and alterations of this invention will become apparent to those skilled in the art from the foregoing description without departing from the scope of this invention, and it should be understood that this invention is not to be unduly limited to the illustrative embodiments set forth herein.

DETAILED DESCRIPTION OF ILLUSTRATIVE EMBODIMENTS OF THE INVENTION

The present invention teaches how an adhesive may be used to bond elements so as to form an insert that can form part of an, e.g. injection mold. That this could be possible is not obvious; a thermoplastic injection mold undergoes rapid and drastic temperature cycling during its operation. Adhesives tend to be poor thermal conductors, and a layer of adhesive separating a stamping surface from the bulk of the thermal mass of the mold would seriously lengthen its cycle time. Furthermore, the integrity of the adhesive would usually quickly break down under such severe thermal stress.

Figure 1:
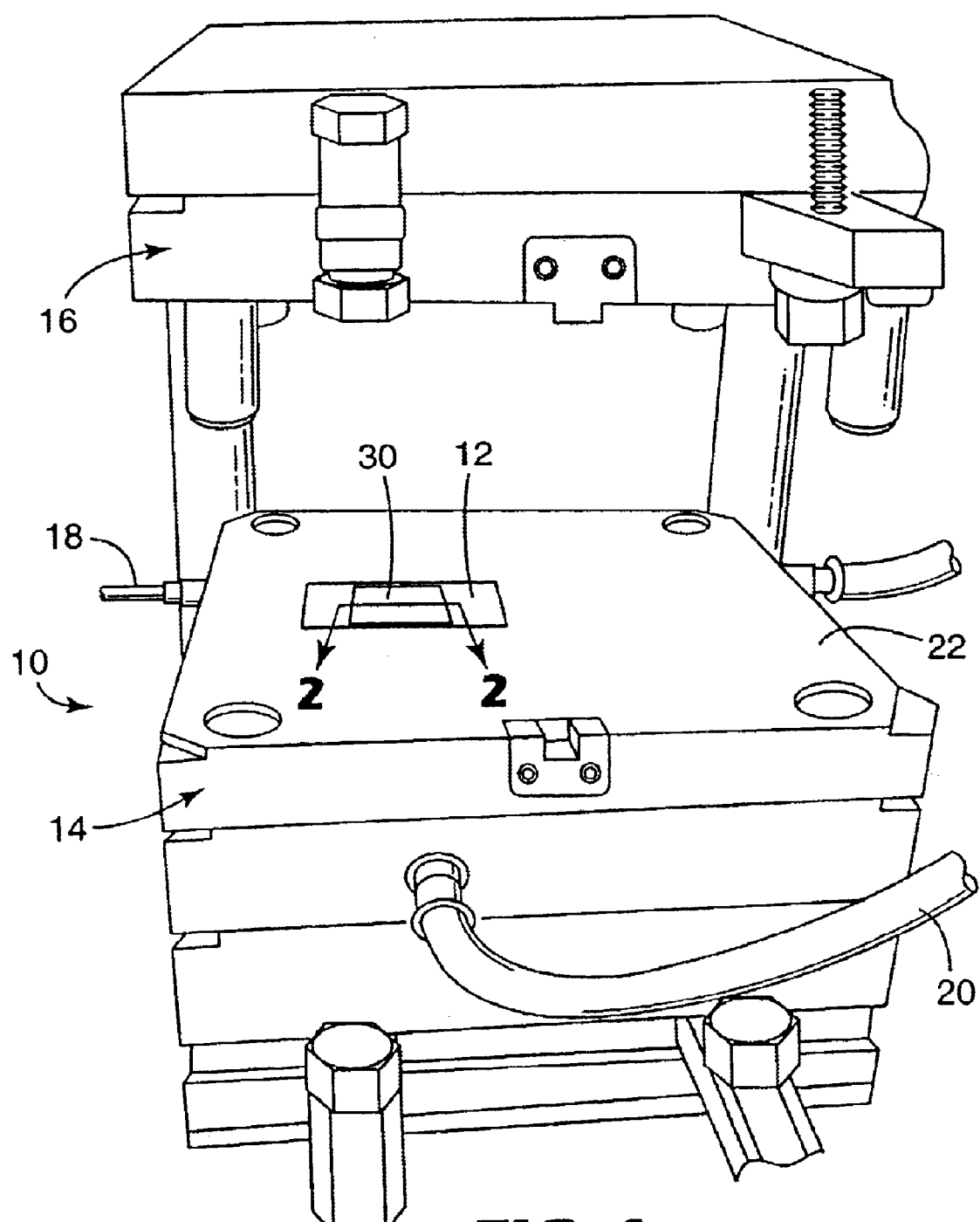
FIG. 1 is a perspective view of a surface of an injection mold, including an insert according to the present invention.

Referring now to FIG. 1, a perspective view of a surface of an injection mold 10 including an insert 12 according to the present invention is illustrated. The depicted mold 10 conveniently includes a first mold portion 14 and a second mold portion 16, although those skilled in the art will realize that a thermoplastic injection mold may have more than two major portions. First and second mold portion 14 and 16 are conveniently made of a material providing a substantial thermal mass and/or, conductivity, e.g. steel, aluminum, or copper and its alloys. Such a construction acts to draw heat away from a polymeric part being formed by the mold from molten polymer introduced under pressure into the mold 10 by input port 18. Optionally, the mold 10 may be further cooled by the introduction of e.g. chilled water via cooling channels 20. The insert 12 is in contact with to first mold portion body 22 in the depicted embodiment, but it will be understood that more than one mold portion may have an insert in other embodiments of the present invention.

Figure 2:
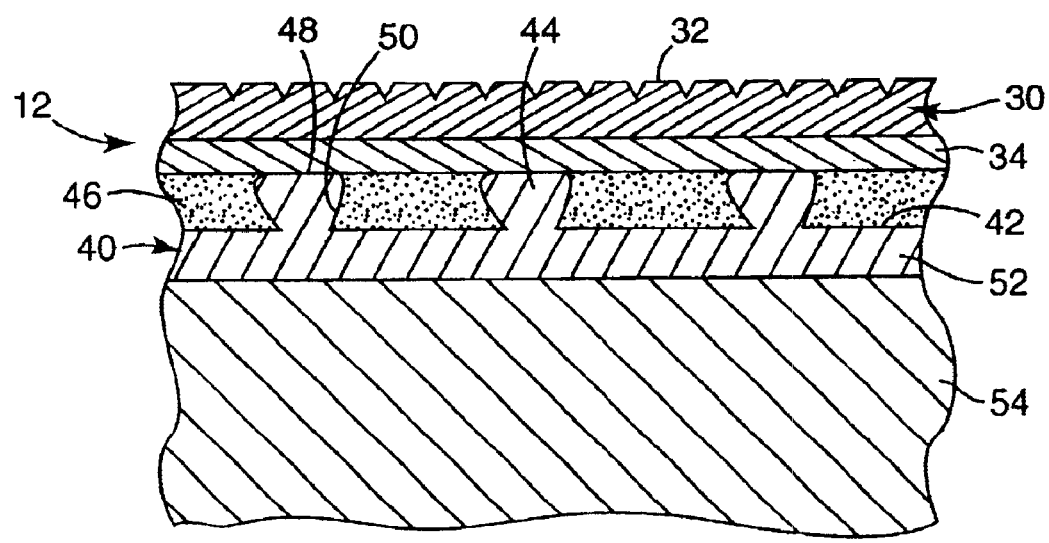
FIG. 2 is a cross-section side view of the insert of FIG. 1, taken along section lines 2—2.

Referring now to FIG. 2, a cross-section end view of the mold 10 of FIG. 1, taken along section lines 2—2, is illustrated. In this view it can be more readily appreciated that the insert 12 includes a stamper 30 having an impression surface 32 and a backing surface 34. The impression surface 32 bears on itself a reverse of the pattern that is to be given to the polymeric part being molded by the mold 10. It is not necessary that the impression surface 32 be of a different material of the backing surface 34, although it is frequently convenient that they be of different materials as will be discussed with more particularity below.

The stamper 30 is supported by a support block 40, the support block 40 having a facing surface 42 having a plurality of projections 44 thereon, the plurality of projections 44 being in contact with the backing surface 34. A quantity of adhesive 46 is disposed between the projections 44 adhering the facing surface 42 to the backing surface 34. While the projections 44 may have various geometries, it is usually convenient for the projections 44 to have generally flat upper surfaces 48 for contacting the backing surface 34. When the upper surfaces 48 are generally flat, it is particularly easy to insure that the stamper 30 is in proper position relative to first mold portion body 22. It is also usually convenient for the projections 44 to have sides 50 that are undercut with respect to the generally flat upper surfaces 48, the better to achieve adhesive bond with the adhesive 46. However, the invention is operable whether sides 50 of the projections 44 have a draft that is negative, zero, or positive.

At least about 5% of the backing surface 34 should be in contact with the flat upper surfaces 48 of the projections 44. A trade-off is involved, since bonding between the stamper backing surface 34 to the support block 40 accomplished by the adhesive 46 and it needs surface area on the backing surface 34 to accomplish this, but the transfer of heat away from the stamper 30 and into the support block 40 accomplished by the projections 44 and they need surface area on the backing surface 34 to accomplish that. It is believed that embodiments where between about 5 percent to 50 percent of the backing surface 34 is in contact with the flat upper surfaces 48 of the projections 44 are particularly suitable. Good results are achieved when between about 10 percent and 35 percent of the backing surface 34 is in contact with the flat upper surfaces 48.

Good results are achieved when the backing surface 34 and the projections 44 have a certain amount of roughness. Such roughness allows a better holding surface for adhesive 46 to take a grip. It also provides microchannels for any adhesive that has been inadvertently placed on the upper surfaces 48 of the projections 44 to be expelled as the stamper 32 is being mounted on the support block 40. A roughness of approximately 2.5 microns (rms) is believed to be suitable with an adhesive viscosity of approx 15,000 centipoise and an assembly force of approximately 12 Mpa. While it is believed that best results are achieved when the upper surfaces 48 are in direct contact with the backing surface 34, it will be understood that it will not usually be convenient to totally exclude adhesive 46 from being between at least some of the upper surfaces 48 and the backing surface 34. For the purposes of this application, the phrase, "the plurality of projections in contact with the backing surface" includes the possibility that some thin layer of adhesive 46 may be present above some or all of the projections 44, between them and the backing surface 34.

A method for fabricating the insert 12 begins with the step of fabricating a stamper 32 having an impression surface 32 and a backing surface 34. One convenient way of fabricating a stamper 32 begins with fabricating a master with a patterned surface. The master is conveniently prepared from diverse organic and inorganic materials using various techniques appropriate to each. For example, masters prepared from metals are conveniently shaped by methods such as machining, diamond turning, grinding, electroforming, ion beam etching electronic discharge machining (EDM) and the like. Masters prepared from polymers are conveniently shaped by photolithography, laser ablation, machining, diamond turning, or the like.

Next, what will soon be the impression surface 32 is electroformed onto the patterned surface of the master. Nickel is often a most convenient impression surface, and both electrolytic and electroless processes are typically convenient for applying it. Then, optionally, what will soon become the backing surface is plated onto what will soon be the underside of the impression surface. Copper and copper alloys, because of their high thermal conductivity and good properties as a substrate for adhesive bonding, are often a most convenient backing surface, and an electrolytic process is typically convenient for applying it. Finally, the impression surface is separated from the patterned surface of the master. This is conveniently done by hand, possibly requiring the use of a knife's edge lightly at the interface between the master and the impression surface as a lever to begin the separation.

The method of making the insert then proceeds with the fabrication of the support block 40. The support block 40 is conveniently fabricated from copper or its alloys when it is desired to maximize heat removal from impression surface, but other metals such as steel may be used. The plurality of projections are conveniently created on the surface of e.g., a copper block, by various structuring methods commonly used in precision metal fabrication. It is believed that projections having a height between about 0.127 mm (0.005 inch) and 6.35 mm (0.250 inch) are workable. Good results have been achieved with projections with a height between about 0.127 mm (0.005 inch) and 0.635 mm (0.025 inch). The support block 40 can be conveniently prepared from a single block of, e.g. copper metal, or it can be a composite as illustrated in FIG. 2, with the projections 44 on a surface layer 50 supported by a base layer 52.

The backing surface is a then positioned in contact with the plurality of projections on what is now the facing surface of the support block. The stamper is adhered to the support block with a quantity of adhesive disposed between the projections. Different classes of adhesives may be used, depending on such factors as the temperature required to melt the material being molded, the molding rate, and the efficiency of the cooling system provided for the injection mold. For many of the applications contemplated for the present invention, adhesives such as epoxy adhesives and silicone adhesives may be used. Suitable adhesives include Scotch-Weld EC-3448 one-component epoxy and Scotch-Weld DP-420 two-component epoxy, both commercially available from 3M Company of St. Paul, Minn. While the invention contemplates a lot of the heat transfer will occur through the projections, is also convenient to choose an adhesive with as much thermal transfer properties as can be achieved with the limitation of providing adequate bond strength and resistance to heat stress. One way of accomplishing this is the use of metal filled adhesives, and metal-filled high temperature epoxy resin systems are considered particularly useful. More particularly, the metal-filled high temperature epoxy resin system commercially available as 70-3810 from Epoxies, Etc. of Cranston, R.I. is considered suitable.

It is possible, although not preferred, to embody the invention with projections on the backing surface, the projections contacting a generally flat facing surface. While such a thing would be more costly to fabricate without distorting the dimensional accuracy of the impression surface, it is considered within the scope of the invention.

Inserts as described above can then be used in conventional injection molding to conveniently provide parts having fine detail. The inserts and method also lends itself to other molding and extruding operations such as, e.g. compression or blow molding. Cost savings are achieved because the inserts can be replaced at relatively low cost when the impression surface has become worn or the product design requires adjustment. It is contemplated that the present invention is particularly useful for making parts for optical interfaces and displays, for microelectronics and data storage products, for microbial detectors, for pharmaceutical delivery, and for tools suitable for genomics and proteomics.

EXAMPLE 1

Figure 3:
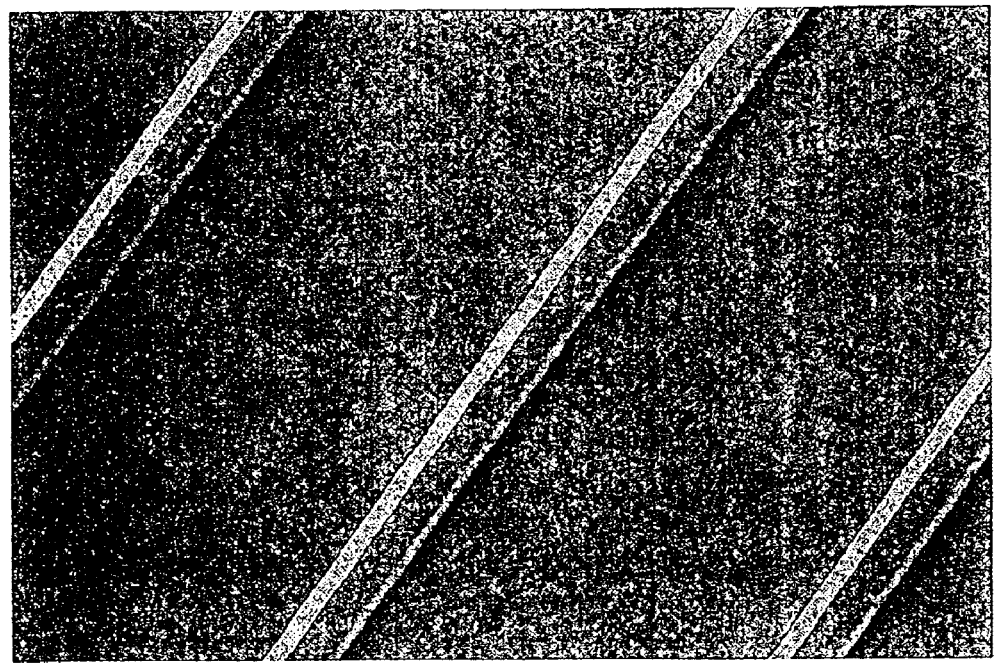
FIG. 3 is a micrograph of the surface of an exemplary optical element formed from polymer injection molded from a mold having an insert according to the present invention.

An insert for an injection mold according to the present invention was fabricated for the purpose of molding a backlight for a PDA. The backlight required was 64 mm by 68 mm by 1 mm, to be prepared from polymethyl methacrylate (PMMA), specifically formulation V825 commercially available from Atohaas N.A. of Bristol, Pa. The backlight required a series of parallel ridges, trapezoidal in shape, having a width across the top of 17.8 microns, and being spaced approximately 100 to 150 microns apart. A photomicrograph of the completed backlight according to the rest of this example is illustrated in FIG. 3.

The shape for the backlight was machined in copper, 0.5 mm thick to form a master, and the master was chemically passivated. A layer of nickel was then electroformed onto the master by electrolytic plating, forming what was to be become the impression surface of a stamper. The layer of nickel had a thickness of about 500 microns.

The plated master was then further treated by electroplating in a copper sulfate solution until layer of copper having a thickness of about 600 microns had been deposited on the nickel surface. The stamper, with its nickel impression surface and its copper backing surface, were then separated from the master with hand tension. As a final step, surface 34 (as seen in FIG. 2) was planarized.

A support block was then fabricated from PAS 940 copper alloy from Ampco Alloys. The flat surface of the copper alloy block was structured to create an array of raised projections, each projection having a height of about 0.38 mm (0.015 inch), and having a square upper surface, each side measuring about 0.25 mm (0.010 inch). The projections were arranged in a rectilinear array with a separation of about 0.51 mm (0.020 inch) between centers. The projections had a slight undercut of about 0.05 mm (0.002) inch on all four sides.

The upper surfaces of the projections and the backing surface of the stamper were then treated with abrasive media to impart a surface roughness of about 2.5 microns. A quantity of a metal-filled high temperature epoxy resin system commercially available as 70-3810 from Epoxies, Etc. of Cranston, R.I. was then disposed upon the support block between the projections. The backing surface of the stamper was then adhered to the support block using the adhesive with the backing surface in firm contact with the upper surfaces of the projections to form the insert.

The insert was then assembled into a mold portion body of a steel injection mold of otherwise conventional construction. The insert was provided with a shoulder on its side that fitted up against a corresponding ledge in the steel injection mold portion, and the insert was bolted in place. The injection mold was then connected to an extruder providing the polymethyl methacrylate at a temperature of 225° C. and an operating pressure of 60 Mpa. The injection mold was then operated using conventional techniques, forming the described backlights.

What is claimed is:

1. An insert for a mold, comprising:
    a stamper having an impression surface and a backing surface;
    a support block having a facing surface having a plurality of projections thereon, the plurality of projections in contact with the backing surface; and
    an adhesive disposed between the sides of the projections for adhering the facing surface to the backing surface.

2. The insert according to claim 1 wherein the projections have generally flat upper surfaces for contacting the backing surface, and wherein between about 5% to 50% of the backing surface is in contact with the generally flat upper surfaces.

3. The insert according to claim 2 wherein between about 10% to 35% of the backing surface is in contact with the flat upper surfaces.

4. The insert according to claim 2 wherein at least a portion of the sides of the projections are undercut with respect to the generally flat upper surfaces.

5. The insert according to claim 1 wherein the stamper is a composite construction such that the impression surface and the backing surface are comprised of different materials.

6. The insert according to claim 5 wherein the impression surface is selected from the group consisting of nickel and nickel alloys.

7. The insert according to claim 5 wherein the backing surface is selected from the group consisting of copper and copper alloys.

8. The insert according to claim 1 wherein the projections are made from a material selected from the group consisting of copper, copper alloys, iron, steel and aluminum.

9. The insert according to claim 1 wherein the adhesive is selected from the group consisting of epoxy adhesives and silicone adhesives.

10. The insert according to claim 9 wherein the adhesive is a metal-filled high temperature epoxy resin system.

11. The insert according to claim 1 wherein the projections have a height between about 0.127 mm and 6.35 mm.

12. The insert according to claim 11 wherein the projections have a height between about 0.127 mm and 0.635 mm.

13. The insert according to claim 1 wherein the insert is adapted for an injection mold.

14. A method for fabricating an insert for a mold, the method comprising:
    fabricating a stamper having an impression surface and a backing surface;
    fabricating a support block having a facing surface having a plurality of projections thereon;
    positioning the backing surface in contact with the plurality of projections; and
    adhering the stamper to the support with a quantity of adhesive disposed between the sides of the projections.

15. The method according to claim 14 wherein the projections have generally flat upper surfaces for contacting the backing surface, and wherein at least about 5% and 50% of the backing surface is in contact with the flat upper surfaces.

16. The method according to claim 15 further comprising the step of undercutting at least a portion of the sides of the projections with respect to the generally flat upper surfaces.

17. The method according to claim 14 wherein the step of fabricating a stamper comprises
    fabricating a master such that the master has a patterned surface;
    electroforming the impression surface onto the patterned surface;
    plating the backing surface onto the impression surface; and
    separating the impression surface from the patterned surface.

18. The method according to claim of 14 wherein the impression surface is selected from the group consisting of nickel and nickel alloys.

19. The method according to claim 14 wherein the backing surface is selected from the group consisting of copper and copper alloys.

20. The method according to claim 14 wherein the projections are made from a material selected from the group consisting of copper, copper alloys, iron and steel, and aluminum.

21. The method according to claim 14 wherein the adhesive is selected from the group consisting of epoxy adhesives and silicone adhesives.

22. The method according to claim 21 wherein the adhesive is a metal-filled high temperature epoxy resin system.

23. The method according to claim 14 wherein the projections have a height between about 0.127 mm and 6.35 mm.

24. The method according to claim 23 wherein the projections have a height between about 0.127 mm and 0.635 mm.

25. An insert for a mold, comprising:
- a stamper having an impression surface and a backing surface;
- a support block having a facing surface;
- a plurality of projections on at least one of the backing surface and the facing surface, the plurality of projections in contact with the other of the backing surface and the facing surface; and
- an adhesive disposed between the sides of the projections for adhering the facing surface to the backing surface.

* * * * *